Oct. 21, 1958    J. W. WOODSON    2,856,689
DIRECTION CORRECTING PELORUS
Filed June 30, 1955    3 Sheets-Sheet 1

INVENTOR
James William Woodson
ATTORNEYS

Oct. 21, 1958

J. W. WOODSON 2,856,689

DIRECTION CORRECTING PELORUS

Filed June 30, 1955

INVENTOR
James William Woodson
ATTORNEYS
Whittemore, Hulbert & Belknap

United States Patent Office 2,856,689
Patented Oct. 21, 1958

2,856,689

DIRECTION CORRECTING PELORUS

James William Woodson, St. Petersburg, Fla.

Application June 30, 1955, Serial No. 519,142

2 Claims. (Cl. 33—72)

This invention relates to navigating instruments and more particularly to a direction correcting pelorus.

One object of this invention is to provide an instrument for automatically converting the compass reading to true direction.

Another object is to provide an instrument of the above description in which account is taken of the varying error due to deviation resulting from changes in ship's heading.

Still another object of the invention is to provide a direction correcting pelorus which may be installed on different vehicles and which is adjustable depending upon the deviation of the magnetic compass of the particular vehicle upon which it is installed.

Another object is to provide an instrument to be used in conjunction with a standard magnetic compass installation to correct all compass errors, so as to enable any person to read all directions, headings, or bearings or their reciprocals at one time without the possibility of error due to adding or substracting errors incorrectly.

Other objects of the invention will appear as the following description proceeds, especially when taken in conjunction with the accompanying drawings, wherein.

Figure 2:
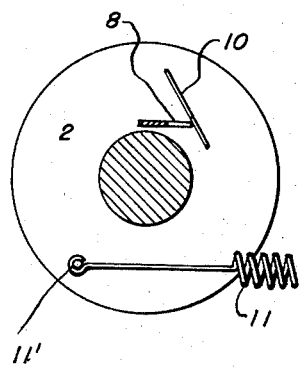
Figure 2 is a sectional view taken along the line 2—2 on Figure 1.
Figure 1:
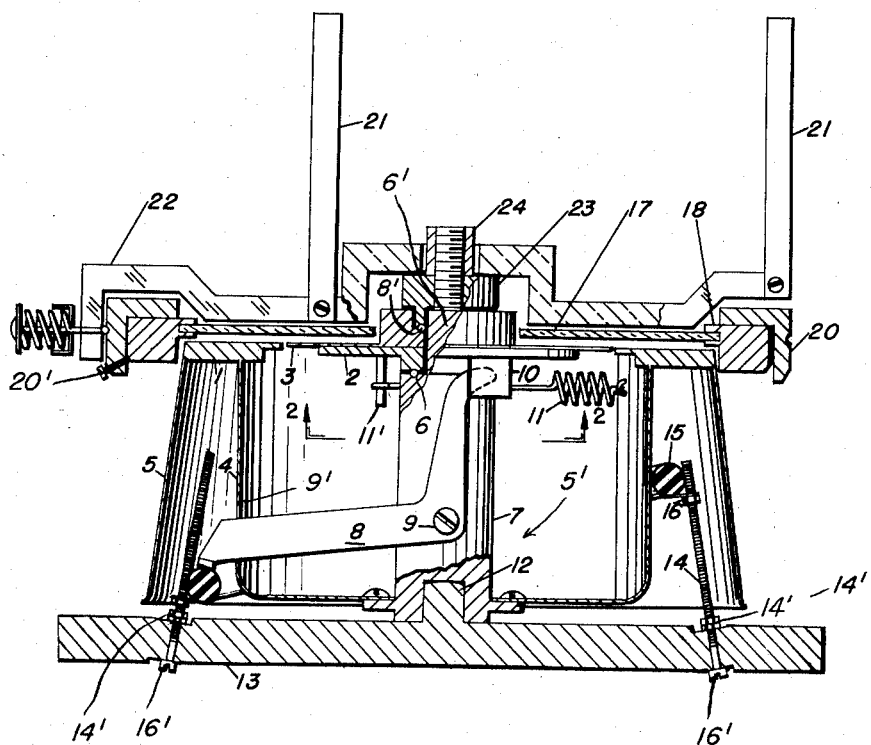
Figure 1 shows a central vertical section through an instrument embodying the invention showing the relationship of all of the component parts, taken on line 1—1 of Fig. 3.
Figure 5:
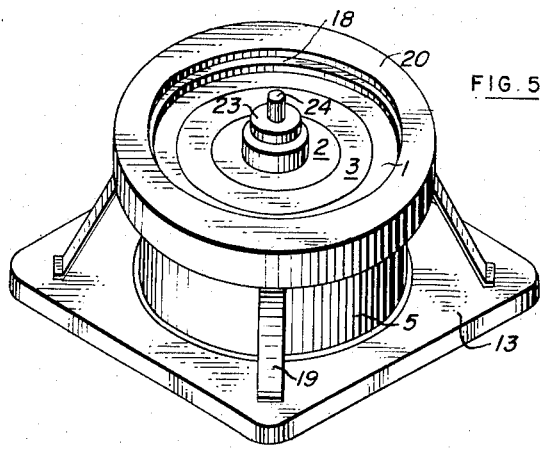
Figure 5 is a perspective view of the instrument having parts removed for clarity.

This instrument somewhat resembles a standard magnetic compass except it is equipped with three Navy type circular compass cards instead of one, a large diameter outer compass dial or card 1, a small diameter inner compass dial or card 2, and a medium diameter compass dial or card 3 between the inner and outer cards.

The outer card 1 which indicates the compass direction is ring shaped and is fixedly mounted on the inner shell 4 and the outer shell 5 of the rotating assembly 5' which includes parts 1–11 inclusive, 23 and 24. The rotating assembly 5' may be rotated by hand for a purpose to be more fully described hereinafter.

The inner compass card 2 is smaller in diameter and is an oscillating disk having a central apertured hub sleeved over the reduced part 6' of post 7 and supported on ball bearings 6 located in an annular groove on the shoulder 6' of central post 7. Card 2 may oscillate clockwise or counterclockwise with respect to the outer card 1 and represents the magnetic direction. The third or middle compass card 3 is also disk-shaped and represents the true direction and is a transparent disk larger in diameter than the magnetic direction card disk 2 on which it rides, and it travels inside of the compass direction card 1. Card 3 is normally held against card 2 by a bearing block 23 threaded on the upper end of post 7. Ball bearings 8' are disposed in an annular array between block 23 and the hub on card 3. Card 3 may be lifted free of the magnetic card when block 23 and bearing 24 are backed off, and rotated clockwise or counterclockwise and set back on the magnetic card 2 to correct for any amount of variation between the true and magnetic directions for the locality of the ship at the time and will hold the set relationship between true and magnetic directions until reset, because of the inherent friction between the engaging surfaces of the cards 2 and 3. Now with variation set between the true and magnetic cards we have to change the relationship between the outer compass direction card 1 and the inner magnetic direction card 2 an amount equal to the deviation of the ship's magnetic compass for the ship's compass heading at the time, so that with the rotating assembly rotated to show the same compass direction heading as indicated by the ship's magnetic compass, the true direction card 3 will be in a true position and all directions and bearings taken from it are true directions. Since deviation may be of various amounts easterly or westerly as ship's heading changes, it is necessary for the relationship of the outer compass card 1 and the two inner cards 2—3 (which are set together and move as one) to constantly change as the ship's heading is changed, an amount equal to the deviation for the ship's compass at each different compass heading of the ship. This is accomplished by having the outer compass direction card 1 mounted on the inner shell 4 and outer shell 5 of the rotating assembly, in the center of which is a center post 7 that forms a supporting bearing on which the magnetic card disk 2 can oscillate clockwise or counterclockwise with relation to the outer or compass direction card 1.

The oscillating movement is controlled by a deviation lever 8 that is free to rotate on a bearing screw 9 secured to post 7 near the bottom thereof.

One end of the deviation lever 8 bears against a fin 10 secured to and projecting beneath disc 2, and the other end of the deviation lever extends out through a vertical slot in the side of the inner shell 4 of the rotating assembly in such a manner that if the extending end of the deviation lever 8 is raised, the other end of the deviation lever 8 bears against the fin 10 on the bottom of the disk 2 and moves the disks 2—3 in a counterclockwise direction, and when the extending end of the deviation lever 8 is lowered, the other end of the lever is backed away from the fin allowing a spring 11 to move the oscillating disks 2—3 in a clockwise direction. The whole rotating assembly is supported on a pivot 12 on which it may rotate, the pivot 12 extending into a bearing in the bottom of post 7. Spring 11 has one end secured to pin 11' projecting beneath card 2 and the other end secured to shell 4.

The pivot 12 is located in the center of a square stationary base 13 the sides of which are placed parallel to the fore and aft line of a ship or to the lubber line of the ship's magnetic compass.

Through the stationary base 13 and extending upward are 36 deviation adjusting screws 14 located 10° apart on a circle in the center of which is the supporting pivot 12. The diameter of the circle is such that it leaves ample clearance between the deviation adjusting screws 14 and the inner shell 4 for a flexible and stretchable annular deviation track 15 of rubber or the like which is supported on and secured to arms 16. Arms 16 are carried by screws 14 and one end of each arm is threaded to and can move up or down the associated threaded deviation adjusting screw 14 when the latter is rotated. By turning a deviation adjusting screw 14 you raise or lower the arm 16 that supports the deviation cam track 15 thereby raising or lowering the deviation track at that point.

It is the function of this track 15 on which the extending end of the deviation lever 8 travels as the movable assembly is rotated on the stationary base 13 to raise or lower the extending end of the deviation lever thereby causing the inner magnetic card 2 and true direction card 3 to oscillate clockwise or counterclockwise the amount necessary to correct for the deviation on the compass heading corresponding to the point on the track on which the deviation lever is resting at the time.

There is a different adjusting screw for each 10 degrees difference in heading. Each screw 14 extends loosely through an opening in base 13 having a screw driver slot 16' in the lower end externally accessible to rotate the screw. Lock nuts 14' threaded on the screws rotate with the screws and cooperate with the screw head to prevent axial shifting of the screws.

In use, the adjusting screws 14 are adjusted, so that the track 15 is the proper height at each adjusting screw to enable the deviation lever 8 as it passes over that point to move the true direction card 3 to the proper relationship to the compass direction card 1. Since the screws are adjustable, the instrument may be adapted to different vehicles. Over these three cards is an annular glass cover 17 having its outer edge mounted in a groove in a stationary relative bearing ring 18 supported by legs 19 attached to the stationary base 13. The underside of the glass has a line of reference or lubber line 17' on it that remains parallel to the lubber line of the ship and of the magnetic compass. With the adjusting screws adjusted according to the deviation table for a particular magnetic compass installation, it is only necessary to change the relationship between the magnetic direction card 2 and the true direction card 3 manually an amount equal to the variation for the locality you are in. Then by rotating the assembly 5' on the base to the point where the compass direction card 1 indicates the same heading as shown at the time by the ship's magnetic compass (to which it has been adjusted), we place the true direction card 3 in a true position where all directions shown by its are true directions.

To find a compass course it is only necessary to set the true direction card 3 to the true course desired and read the compass course on the compass direction card 1.

Figure 3:
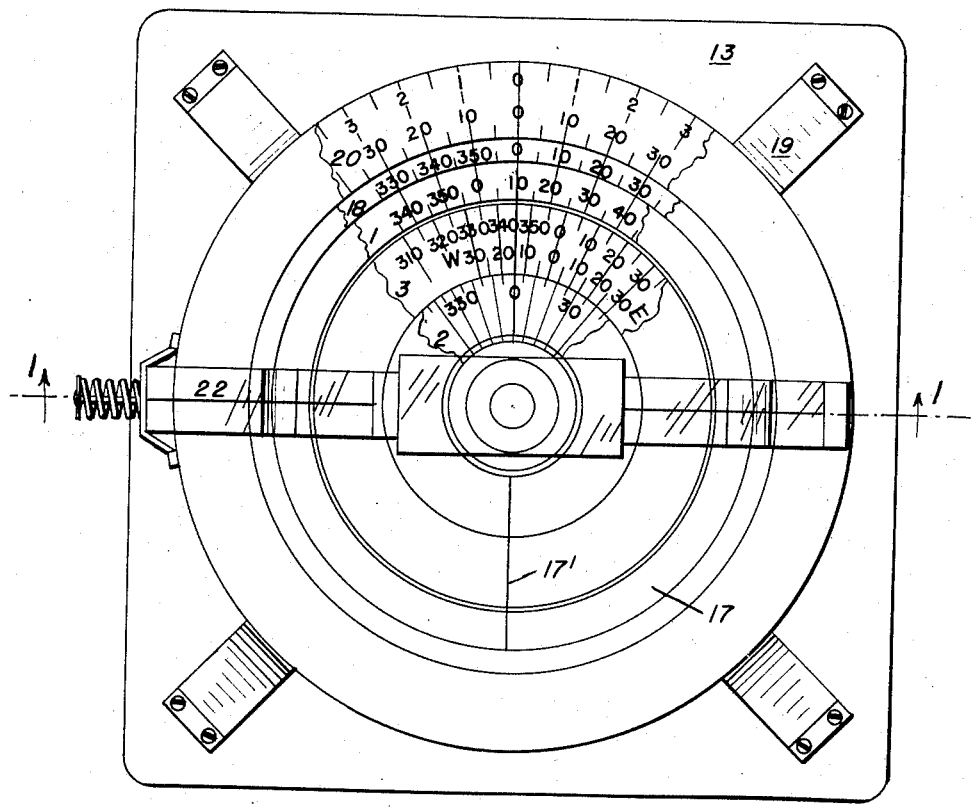
Figure 3 is a top plan view of the instrument showing the relationship of three Navy type compass cards which rotate or oscillate under a lubber line and respectively show compass, true and magnetic directions. Shown also are the sighting vanes and sighting arm mounted so as to swing 360° around the machine, enabling bearings to be taken over all three cards at one time.
Figure 4:
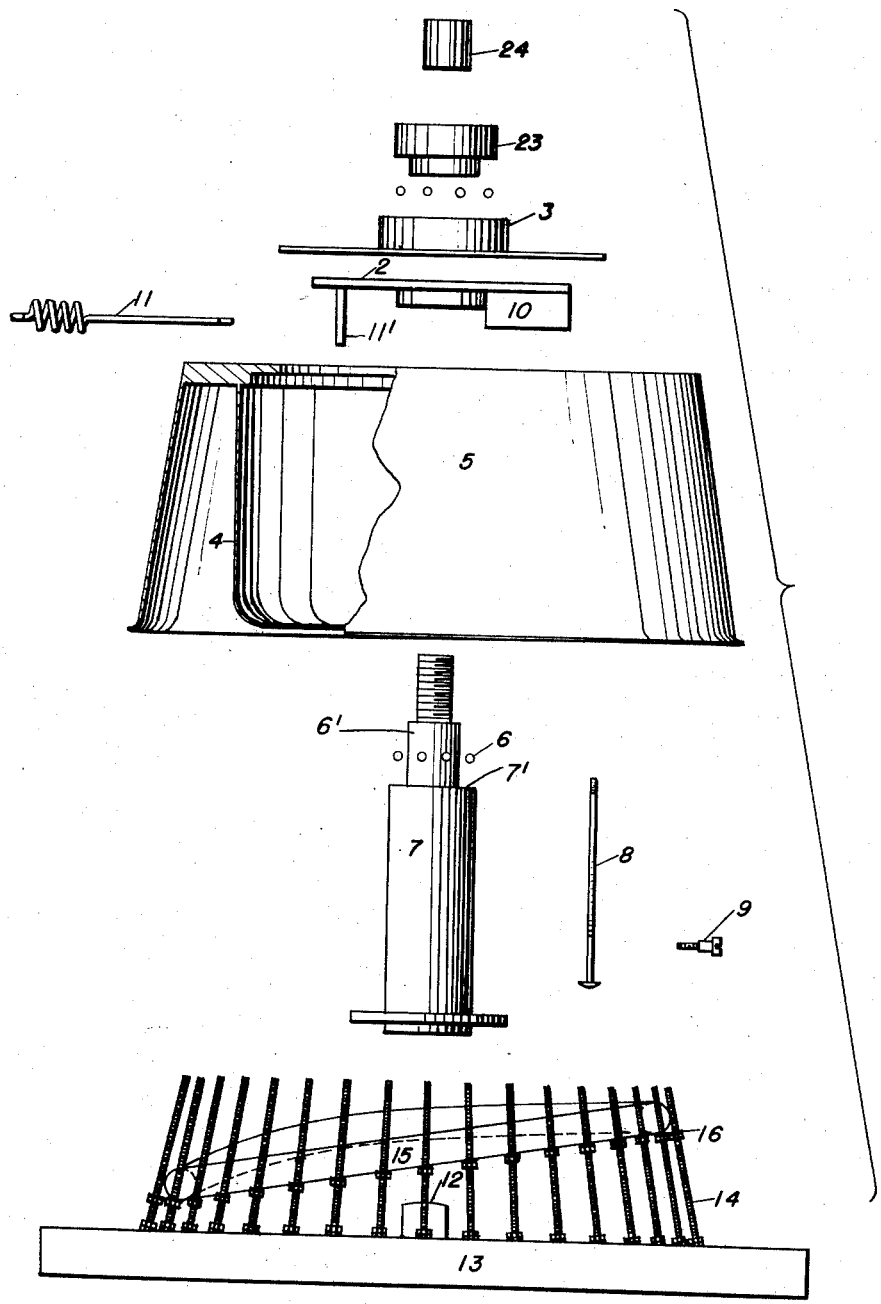
Figure 4 is an exploded view of the instrument.

Assume, for example, that the variation for the particular locality is 15° W. The card 3 is then rotated to the position shown in Figure 3 relative to card 2. Then, to find a compass course, the rotating assembly 5' is turned until the true course desired is under the lubber line whereupon the compass course will appear on card 1 under the lubber line and may be read directly. Thus, variation and deviation are automatically accounted for.

Resting on top of the relative bearing ring 18 is a loose rotatable bearing ring 20 graduated from 0 dead ahead to 180 degrees clockwise to starboard and from 0 degrees dead ahead to 180 degrees counterclockwise to port.

Also on the outer rim of this ring 20 are graduations corresponding to points on the bow and quarter to port and starboard with the most used pairs of bearing points indicated.

The loose bearing ring may be turned to left or right to allow for leeway and locked in position by screw 20'. The machine is equipped with sighting vanes 21 mounted on a sighting arm 22 that can swing 360 degrees over the three cards enabling all bearings to be read as true, magnetic or compass bearings as well as their true reciprocals for plotting on charts. The sighting arm rests on a bearing block 23 and swings around the sighting arm bearing 24 which extends through an opening in arm 22 and is threaded on the upper end of post 7.

What I claim as my invention is:

1. A pelorus for a navigable vehicle comprising a base, an elongated post extending upwardly from said base and mounted thereon for rotation about its longitudinal axis, a generally cup-shaped shell rigidly secured to said post for rotation as a unit therewith, said shell having a central aperture in the bottom wall receiving said post and rigidly secured thereto, the annular side wall of said shell extending upwardly from the bottom wall thereof in concentric relation with said post, a first ring member carried by said shell at the upper end of the annular side wall thereof in concentric relation with said post, a second ring member of smaller diameter than said first ring member carried by said post above the bottom wall of said shell, means mounting said second ring member on said post in concentric relation with said post and for rotation about an axis coinciding with the longitudinal axis of said post, means providing a fixed line of reference extending across and above said first and second ring members, said ring members having indicia thereon corresponding to the degrees of a circle and being rotatable about the axis of said post past said line of reference whereby the spaced indicia on each member successively appear opposite said line to enable accurately reading the same, means providing a variable connection between said members for movement of said second member as a unit with said first member, and means for automatically varying said connection in response to movement of said first member to rotate said second member relative to said first member a distance corresponding to the deviation of the vehicle's magnetic compass at the vehicle heading represented by the indicia on said first member opposite said fixed line, said last-named means including a bell crank pivotally connected to said post between the bottom wall of said shell and said second ring member, an annular cam track surrounding the annular side wall of said shell and having a contour corresponding to the deviation of the vehicle's magnetic compass at the various vehicle headings, a slot in the annular side wall of said shell through which one arm of said bell crank extends, a cam follower on said one arm engageable with said cam track, means on the other arm of said bell crank engageable with a part on said second member, and spring means interposed between said shell and said second member tending to rotate said second member in a direction to maintain a yielding engagement between said part of said second member and said means on the other arm of said bell crank.

2. A pelorus as defined in claim 1 in which said cam track is in the form of a flexible ring, and means for adjusting said flexible ring to vary the contour thereof, said means including an annular series of screws carried by said base and respectively connected to said flexible ring at uniformly spaced points therealong, said screws being individually adjustable to vary the contour of the cam track as desired.

References Cited in the file of this patent

UNITED STATES PATENTS

| 499,087 | Baker | June 6, 1893 |
| 1,767,117 | Brower | June 24, 1930 |

FOREIGN PATENTS

| 51,125 | Austria | Dec. 11, 1911 |
| 603,140 | France | Jan. 6, 1926 |